United States Patent [19]

Gregg et al.

[11] 3,786,551
[45] Jan. 22, 1974

[54] PISTON PULLER

[76] Inventors: Jack C. Gregg, 1518 Glenview Dr.;
Samuel L. Davis, R.R. No. 3, both of Elwood, Ind. 46036

[22] Filed: Apr. 10, 1972

[21] Appl. No.: 242,635

[52] U.S. Cl............... 29/266, 29/282, 254/100, 254/133
[51] Int. Cl............................................. B23p 19/04
[58] Field of Search 29/234, 280, 281, 282, 256–266; 254/98, 100; 269/48.1

[56] References Cited
UNITED STATES PATENTS
2,688,183   9/1954   Oberley ............................ 29/282 X
914,743   3/1909   McDonald ......................... 269/48.1

Primary Examiner—Granville Y. Custer, Jr.
Assistant Examiner—Harold P. Smith, Jr.
Attorney, Agent, or Firm—Hood & Coffey

[57] ABSTRACT

Apparatus for use in removing and reinstalling pistons in disc brake assemblies of the type including a caliper housing providing a bore in which the piston is reciprocably disposed, the bore being open at one end and closed at its opposite end, and the piston being hollow with a closed end adjacent the closed end of the bore and an open end adjacent the open end of the bore. Such caliper housings also provide an outboard shoe support bracket spaced axially apart from the open end of the bore. The apparatus comprises a threaded shaft which extends through an opening in the said support bracket to have one of its ends received in the hollow of the piston. A rubber-like grommet is disposed on that one end of the threaded shaft between a fixed abutment and a movable abutment. A nut is advanced against the movable abutment to compress axially the grommet to cause it to expand radially frictionally to engage the piston. Another nut and an adapter plate are advanced against the axially outer side of the support bracket to pull the piston and against the axially inner side of the support bracket to push the piston inwardly.

6 Claims, 3 Drawing Figures

PATENTED JAN 22 1974 3,786,551

3,786,551

PISTON PULLER

It is a primary object of the present invention to provide an apparatus ideally suited for use in removing and reinstalling pistons in disc brake assemblies of the type including a caliper housing providing a bore in which the piston is reciprocably disposed and an outboard shoe support bracket spaced axially outwardly from the bore. Such caliper housings are formed so that the bore is open at one end, the end facing the support bracket, and closed at its opposite end. The shoe support brackets are formed with openings therethrough generally aligned with the bore. Conventionally, the pistons reciprocably disposed in such bores are hollow cylindrical pistons with a closed end adjacent the closed end of the bore and an open end adjacent the open end of the bore. There is no piston rod, as such, connected to the piston. The piston itself is moved axially outwardly by hydraulic fluid to push an inboard shoe with a brake lining against the disc of the brake. Of course, an outboard shoe and brake lining are supported by the said bracket to engage the opposite side of the disc.

Particularly, the open end of the piston is against the inboard shoe and lining. The piston moves only a small fraction of an inch in the braking process. That is, when the brakes are actuated, the piston moves axially outwardly only a small fraction of an inch. When the brakes are released, the piston moves axially inwardly to release the disc. This rather small axial movement of the piston must be free in order for the brakes to work properly. Conventionally, such pistons are axially short in length and large in diameter to provide the required braking force for a given hydraulic pressure.

Because the pistons do not move axially relatively large distances, there is a tendency for the pistons to stick. The sticking may be caused by dirt and/or corrosion on the piston or on the wall of the bore. The seals about the pistons serve to wipe and clean the piston only for the short axial distance of its reciprocation. As the brakes wear until the seals come into contact with the corroded or dirty surfaces, the piston is likely to stick.

Since the piston is hollow and axially short as compared to its diameter, it is extremely difficult to remove the piston from its bore in the caliper housing. It cocks easily about its axis to bind in the bore.

Techniques presently being used for removing such pistons tend to damage the pistons. For instance, one common technique is to drill a hole in the piston and then tap a thread into that hole. The piston is then removed by threading a rod into the tapped hole and pulling on the rod.

The apparatus of the present invention is ideal because it includes a rubber-like grommet which is radially expanded by axial compression uniformly and concentrically to engage the internal diameter of the hollow of the piston. Once the grommet is in frictional engagement with the piston, the piston can be pulled from the bore or pushed into the bore. The grommet is carried on a threaded shaft. In the illustrative embodiment, it is compressed axially between a fixed washer plate and a movable washer plate by means of a nut which is advanced against the movable plate. An adapter plate is placed on the shaft on the axially outer side of the outboard shoe support bracket, and another nut is advanced against the plate to pull the piston from its bore. When the adapter plate is placed against the axially inner side of the support bracket and the nut is advanced against the plate, the piston is pushed into its bore.

The present invention, therefore, comprises a simple but very effective tool for gripping and pulling such hollow pistons from disc brake assemblies and then gripping and pushing such pistons into the assemblies.

Other objects and features of the present invention will become apparent as this description progresses.

To the accomplishment of the above and related objects, this invention may be embodied in the form illustrated in the accompanying drawings, attention being called to the fact, however, that the drawings are illustrative only, and that change may be made in the specific construction illustrated and described, so long as the scope of the appended claim is not violated.

Figure 1:
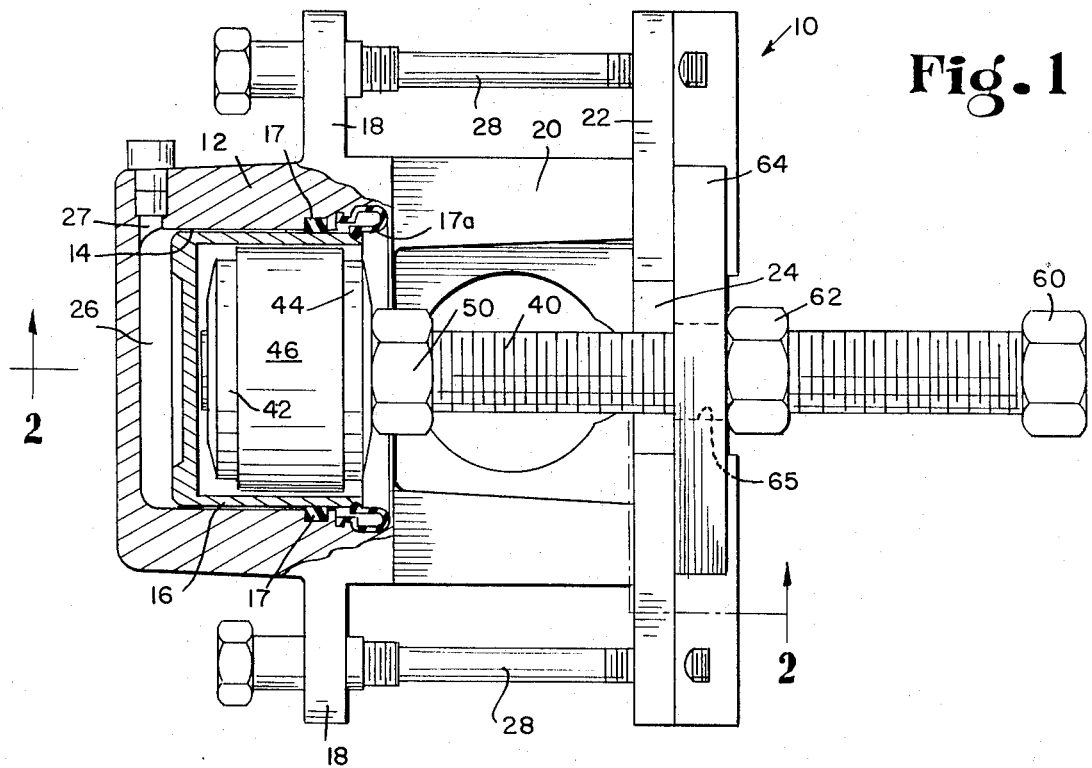
FIG. 1 is a partially sectioned plan view of a caliper assembly and the apparatus of the present invention engaged with the piston in that assembly.

Referring now to the drawings, it will be seen that there is illustrated a conventional caliper brake assembly, indicated generally by the reference numeral 10, comprising a caliper housing 12 providing a cylindrical bore 14 which is closed at its axially inner end (left-hand end) and open at its opposite end. A hollow cylindrical piston 16 is disposed in the bore 14 for axial reciprocation, the piston having a closed end adjacent the closed end of the bore and an open end adjacent the open end of the bore.

Conventionally, a ring-type seal 17 is disposed in a peripherally extending groove in the bore 14 to be about the outer periphery of the piston 16 and a contamination seal 17a is provided about the outer periphery of the piston adjacent the open end of the bore as illustrated.

The caliper housing is also formed to provide radially outwardly extending flanges 18, an axially outwardly extending bracket portion 20, and an outboard shoe supporting bracket 22 at the axially outer end of the portion 20. The bracket 22 is provided with a generally U-shaped opening 24 aligned with the bore 14. Conventionally, as is well known in the brake arts, a portion of the periphery of the disc is disposed between the open end of the bore 14 and the support bracket 22, the disc being rotatable about an axis parallel to and spaced apart from the axis of the bore 14. An inboard shoe is carried by the caliper housing to be adjacent the open end of the bore 14. The piston 16 moves axially outwardly (to the right) to move the inboard shoe against the disc. This results in a braking action. The piston moves to the right when hydraulic fluid is forced into the rather axially short cavity 26 at the closed end of the bore 14. A port 27 is provided for admitting hydraulic fluid to the cavity 26.

A pair of bolts 28 used in supporting the caliper housing and the shoes is illustrated.

The apparatus for removing and reinstalling the piston 16 comprises a threaded shaft 40, to the distal end of which is fixed an axially flat, washer-like circular abutment element 42. The outer diameter of the element 42 is less than the internal diameter of the hollow of the piston 16 as illustrated. The element 42 may be rigidly fastened to the shaft 40 in a number of different ways. For instance, the element 42 may be threaded onto a reduced and threaded portion of the shaft 40.

Axially inwardly from the element 42 is another such element 44 which is axially movable relative to the threaded shaft. Disposed between the two elements 42, 44 on the threaded shaft is a rubber-like grommet 46. In its free state, i.e., axially unloaded, the outer diameter of the grommet 46 is slightly less than the internal diameter of the hollow of the piston 16. Then, a nut 50 is threaded on the shaft 40 and arranged to advance the element 44 toward the element 42 axially to compress the grommet 46. This compression of the grommet causes it radially to expand into frictional engagement with the internal diameter of the piston 16. The grommet expands uniformly radially such that the piston is uniformly concentrically engaged by the grommet.

The element 42 constitutes a first abutment means and the element 44 and its nut 50 constitute a second abutment means threadedly engaged on the shaft for movement toward and away from the first abutment means.

Means, such as the nut 60, is attached rigidly to the shaft 40 to prevent rotation of the shaft when the nut 50 is advanced or when another nut 62 is advanced. The nut 60 may be threaded onto the shaft 40 and then soldered, welded or brazed into place. It will be appreciated that a conventional wrench may be used to hold the nut 60 or that the nut may be left off and a handle of some sort may be welded or otherwise rigidly attached directly to the shaft 40.

The nut 62 cooperates with an adapter plate 64 which is formed to have an inverted, U-shaped slot 65 entering its bottom edge, that slot being sufficiently deep and wide to receive the shaft 40 as illustrated.

The adapter plate 64 is provided, at each of its sides, with inclined surfaces 66 which engage oppositely inclined surfaces 68, respectively, of the support bracket 22. The inclined surfaces 68 result from the extension of material at the point 68a to strengthen the support bracket 22. Adjacent the slot 24 in the support bracket 22, the axially outer surface 69 of the support bracket is generally perpendicular to the axis of the bore 14, and the adapter plate 64 is formed to provide a surface 70 which engages that surface 69 about the opening 24.

Figure 2:
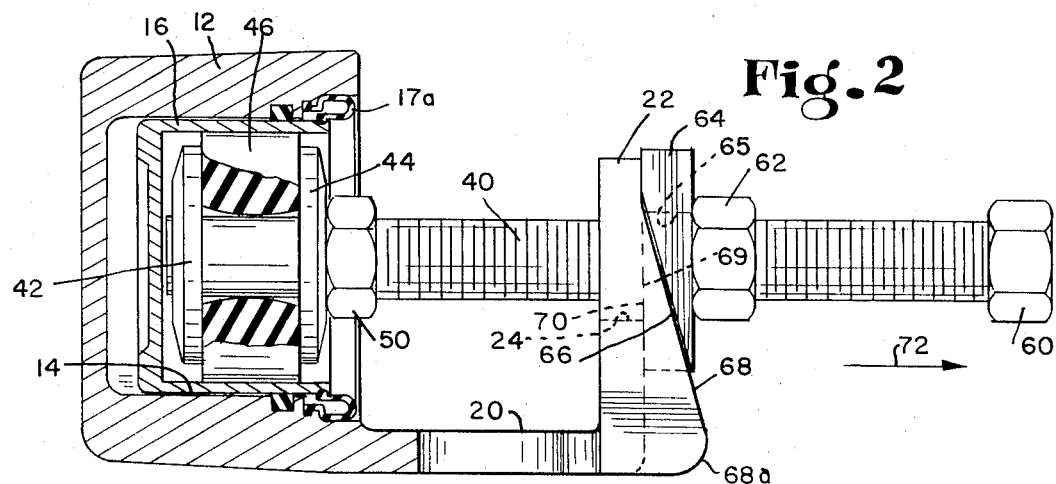
FIG. 2 is a sectional view taken along the line 2—2 in FIG. 1 and showing the apparatus of the present invention used to pull the piston.

Thus, when the adapter plate 64 is placed between the axially outer surface of the support bracket 22 and the nut 62 is advanced against the plate, the element 42 is moved in the direction of the arrow 72 in FIG. 2. When the grommet is engaging the piston, that movement will pull the piston from the bore 14. Since the engaging surfaces 69, 70, and the surface of the plate engaged by nut 62 are perpendicular to the axis of the shaft 40 and the bore 14, the piston 16 will be pulled axially outwardly to keep it from cocking in the bore.

Figure 3:
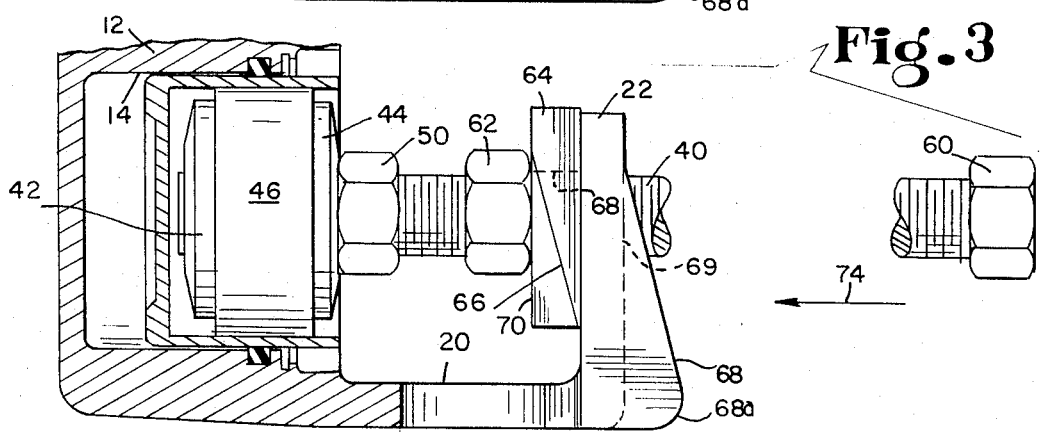
FIG. 3 is a view similar to FIG. 2 except that it shows the apparatus of the present invention used to push the piston into the bore.

Alternatively, when the adapter plate 64 is placed against the axially inner surface of the bracket 22 and the nut 62 is advanced against the bracket, a piston 16 engaged by the grommet 46 can be pushed axially into the bore 14 as indicated by the arrow 74 in FIG. 3.

The expansion of the rubber grommet 46 into frictional engagement with the internal diameter of the piston 16 will not damage the piston. Once the piston is removed, it can be cleaned and, if its surface is not pitted, it can be replaced into a bore 14 which has been cleaned and the seals 17, 17a of which have been replaced.

The apparatus of the present invention can be provided with a plurality of different size grommets 46 to accommodate the various size pistons 16.

What is claimed is:

1. Apparatus for use in removing and reinstalling pistons in disc brake assemblies of the type including a caliper housing providing a bore in which a piston is reciprocably disposed, the bore being open at one end and closed at its opposite end, and an outboard shoe support bracket spaced axially apart from the open end and having axially outer and inner sides and an opening therethrough generally aligned with the bore, the piston being a hollow cylindrical piston with a closed end adjacent the closed end of the bore and an open end adjacent the open end of the bore, said apparatus comprising a threaded shaft having a distal end, a proximal end and an intermediate portion, said shaft being proportioned and designed to extend axially through the opening in the support bracket with its said distal end received in the hollow of the piston, first abutment means affixed to the distal end and proportioned and designed to be received in the hollow, second abutment means threadedly engaged on said shaft for movement toward and away from said first abutment means, a rubber-like grommet disposed on said shaft between said abutment means to be at least partially received in the hollow, said grommet having a free outer diameter less than the internal diameter of the hollow, said grommet being radially expansible to a diameter greater than the internal diameter when axially compressed between said first and second abutment means frictionally to engage and grip the piston, and third abutment means threadedly engaged on said intermediate portion for movement relative thereto, said third abutment means being engageable with the axially outer side of the support bracket to pull the piston outwardly and with the axially inner side of the bracket to push the piston inwardly.

2. The apparatus of claim 1 in which said third abutment means includes an adapter plate having a slot extending into one edge thereof, said slot being proportioned and designed to receive said shaft, and a nut threadedly engaged on said shaft to abut against said plate, said plate being proportioned and designed to abut against the axially outer side when pulling the piston and the axially inner side when pushing the piston.

3. The apparatus of claim 1 in which said shaft provides means engageable by a tool to hold said shaft against rotation when said second and third abutment means are moved relative to said shaft.

4. The apparatus of claim 1 in which said first abutment means includes an axially flat circular element concentrically attached to said distal end, said second abutment means including an axially flat circular washer freely axially movable on said shaft and against said grommet and a nut threaded on said shaft for moving said washer toward said circular element.

5. The apparatus of claim 4 in which said third abutment means includes an adapter plate having a slot extending into one edge thereof, said slot being proportioned and designed to receive said shaft, and a nut threadedly engaged on said shaft to abut against said plate, said plate being proportioned and designed to abut against the axially outer side when pulling the piston and the axially inner side when pushing the piston.

6. The apparatus of claim 5 in which said shaft is provided with means engageable by a tool to hold said shaft against rotation when said second and third abutment means are moved relative to said shaft.

* * * * *